(12) United States Patent
Neuman

(10) Patent No.: US 10,932,406 B1
(45) Date of Patent: Mar. 2, 2021

(54) SEED SPACING

(71) Applicant: Daniel R. Neuman, Loami, IL (US)

(72) Inventor: Daniel R. Neuman, Loami, IL (US)

(73) Assignee: Mantiff, Inc., Loami, IL (US)

( * ) Notice: Subject to any disclaimer, the term of this patent is extended or adjusted under 35 U.S.C. 154(b) by 233 days.

(21) Appl. No.: 16/210,471

(22) Filed: Dec. 5, 2018

Related U.S. Application Data

(60) Provisional application No. 62/608,837, filed on Dec. 21, 2017.

(51) Int. Cl.
*A01C 7/12* (2006.01)
*A01C 7/20* (2006.01)

(52) U.S. Cl.
CPC . *A01C 7/12* (2013.01); *A01C 7/20* (2013.01)

(58) Field of Classification Search
CPC .... A01C 7/12; A01C 7/08; A01C 7/00; A01C 7/20; A01C 21/00; A01C 7/128; A01C 7/127
See application file for complete search history.

(56) References Cited

U.S. PATENT DOCUMENTS

| | | | | |
|---|---|---|---|---|
| 6,109,193 | A * | 8/2000 | Crabb | A01C 7/046 111/185 |
| 6,477,967 | B2 | 11/2002 | Rosenboom | |
| 2002/0066743 | A1* | 6/2002 | Hak | A01C 7/128 221/263 |
| 2016/0338261 | A1* | 11/2016 | Hak | A01C 7/046 |

OTHER PUBLICATIONS

Agronomy Guide AY-217, Purdue University Cooperative Extension Service, West Lafayette, Indian. "Plant Populations and Seeding Rates for Soybeans" by E.P. Christmas. Retrieved from Internet URL www.extension.purdue.edu/extmedia/AY/AY-217.html on May 23, 2018.

* cited by examiner

*Primary Examiner* — Christopher J. Novosad
(74) *Attorney, Agent, or Firm* — Philip L. Bateman

(57) ABSTRACT

Seeds are planted in a repeating pattern of a group of seeds with a seed spacing and then a group spacing with no seeds wherein the group spacing is at least two times the seed spacing. The grouping of seeds results in an improved plant emergent rate and improved yields in cloddy, compacted, and crusted soil.

12 Claims, 5 Drawing Sheets

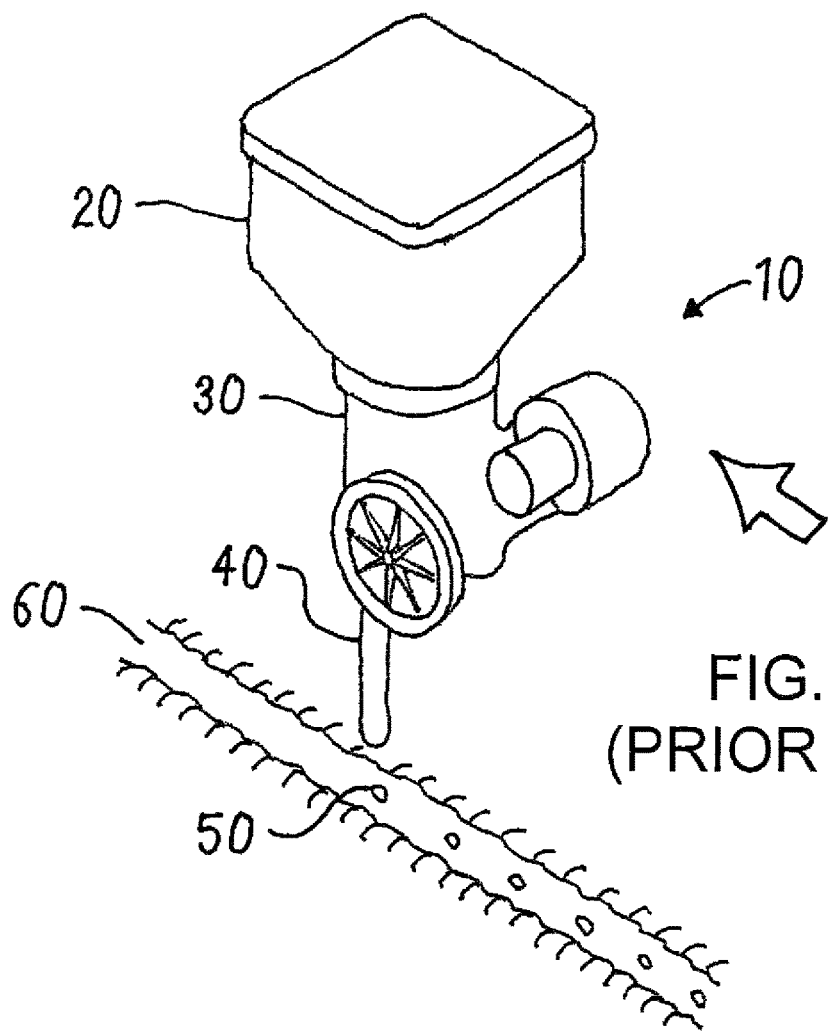
FIG. 1
(PRIOR ART)
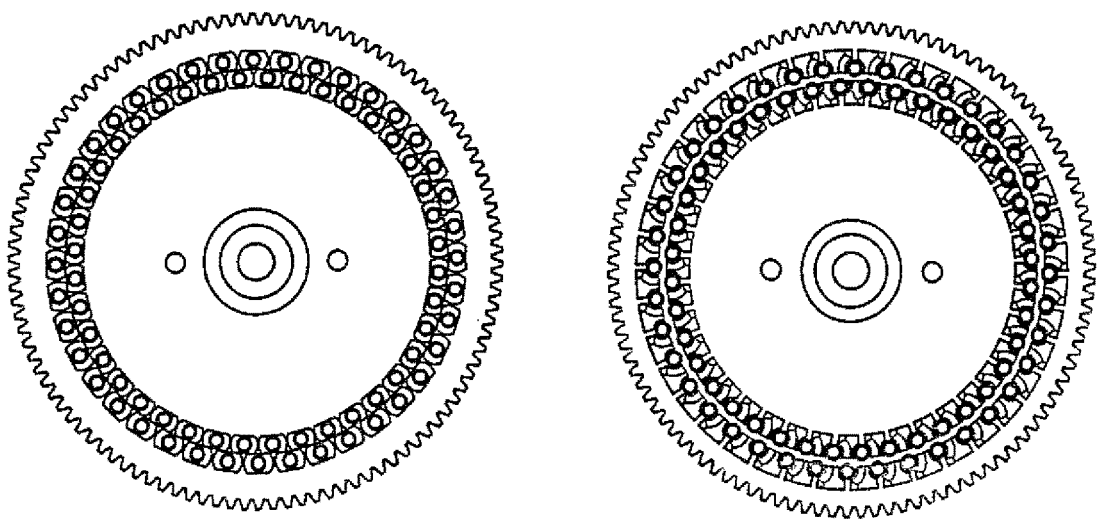
FIG. 2
(PRIOR ART)
FIG. 3
(PRIOR ART)

FIG. 10
FIG. 11
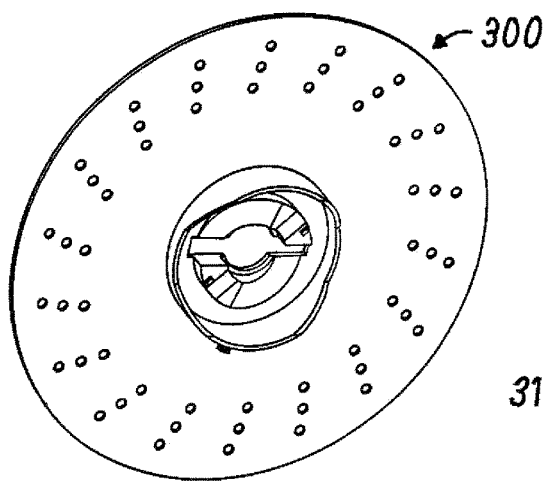
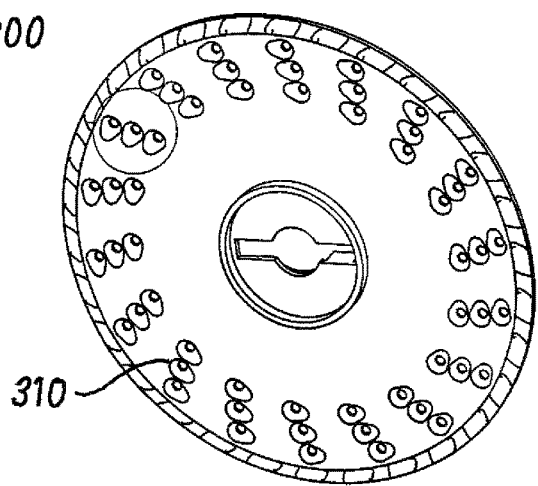
FIG. 12
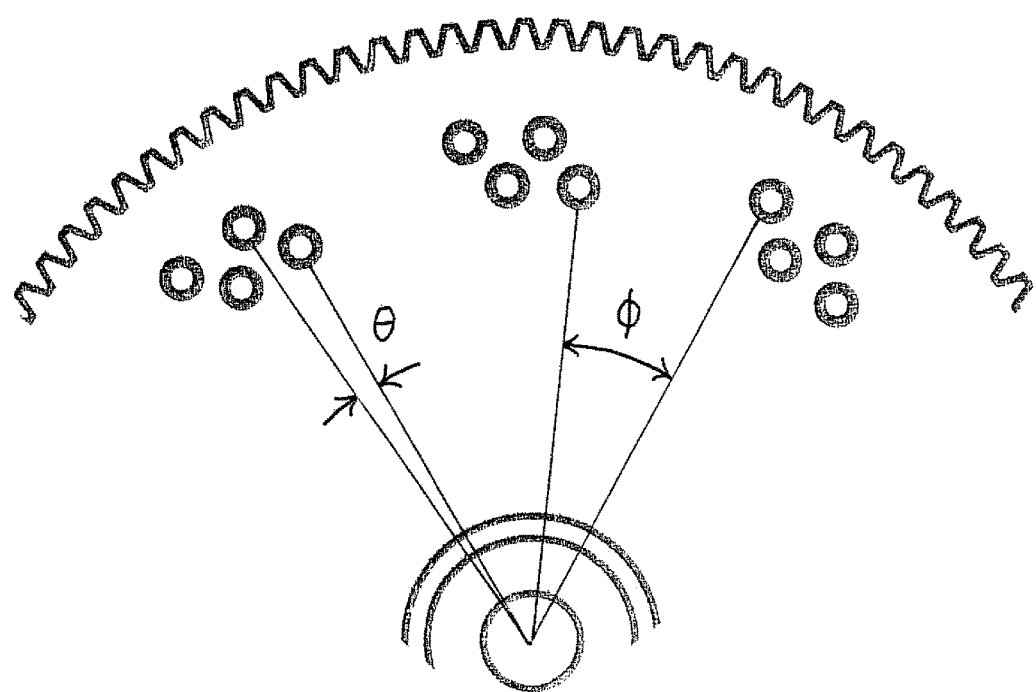

SEED SPACING

CROSS-REFERENCE TO RELATED APPLICATION

This application claims the benefit of U.S. Provisional Application Ser. No. 62/608,837, Dec. 21, 2017.

FIELD OF THE INVENTION

This invention relates to farming. More particularly, this invention relates to an apparatus and a method for improved seed spacing during planting.

BACKGROUND OF THE INVENTION

It is well known that crops such as soybeans and corn grow best when optimally distributed in a field. Seeds for these crops are typically planted in straight rows so distribution in a field is determined by the spacing between the rows and by the spacing between seeds in a row. As used herein, "row spacing" refers to the spacing between rows and "seed spacing" refers to the spacing of individual seeds in a row.

Seeds such as soybeans and corn are typically planted with planters having multiple planting units. Twenty or more rows are often planted with each pass through a field. Each planting unit typically has a hopper to hold seed, a seed meter to control the seeding rate, and a delivery tube or other means for delivering seed from the seed meter to a trench (also known as a furrow) in the ground.

The seed meter typically includes a rotating circular plate having receptacles around the circumference near the outside edge (i.e., the periphery). As the plate rotates, each receptacle passes through successive chambers. A first chamber is filled with seeds and often has a pressure differential applied across the face of the plate that causes a seed to be retained in each receptacle. The pressure differential is sometimes created by generating a greater-than-atmospheric pressure on one face and is sometimes created by generating a less-than-atmospheric pressure (i.e., a partial vacuum) on one face. A second chamber releases the pressure differential to allow the seed to drop down into the delivery tube. An extruder (also known as an extractor) is sometimes used to help release the seeds from the receptacles.

A representative seed meter is disclosed in Deckler, U.S. Pat. No. 3,999,690, Dec. 28, 1976, which is hereby incorporated by reference. The Deckler seed meter has a plate with openings (i.e., holes) forming the receptacles. Other seed meters have plates with recesses (i.e., indentations) forming the receptacles and the seeds are held in place with brushes or other physical means rather than with a pressure differential. Conventional seed meters have plates with a uniform distribution of receptacles around the periphery. In other words, the radial angle spacing between the receptacles is constant, just as the radial angle spacing between minute markers on a clock face are a constant 6 degrees (360 degrees divided by 60 minutes). This uniform distribution of receptacles results in a uniform spacing of seeds in the trench.

A typical prior art planting unit 10 is shown in FIG. 1. The planting unit contains a hopper 20, a seed meter 30, and a delivery tube 40. The seeds 50 are planted into a trench 60 with uniform spacing. Various components are omitted for clarity and the large arrow indicates the direction of travel. The rotating plate of the seed meter is located internally and is not visible. The front side of the rotating plate of the seed meter is shown in FIG. 2 and the back side (the side on which the seeds are held) of the rotating plate is shown in FIG. 3. The rotating plate shown is from a seed meter manufactured by Precision Planting LLC of Pontiac, Ill. It can be seen that the eighty receptacles are arranged in two concentric circles, an inner circle of forty receptacles and an outer circle of forty receptacles, around the periphery. The receptacles have a uniform radial angle spacing of 4.5 degrees between them (360 degrees divided by 80 as measured from the center of each receptacle). Arranging the eighty receptacles in two circles maximizes the number of receptacles that can fit on the plate.

Referring now to FIG. 4, two adjacent rows with uniformly spaced seeds resulting from the Precision Planting seed meter described above are shown in a top view. This drawing and other drawings are not to scale. In this drawing and other drawings, the seeds are shown in the trench before being covered by the soil. The distance "RS" is the row spacing and the distance "SS" is the seed spacing. For a given seed meter and plate, the seed spacing is a function of the speed of the tractor pulling the planter and the rotational speed of the plate in the seed meter.

A large amount of research has been conducted to determine optimal seed spacing. The article "Plant Populations and Seeding Rates for Soybeans" by E. P. Christmas of the Purdue University Cooperative Extension Service contains a table with suggested seed spacing for different row widths. As an example, for a row width of thirty inches and with the assumption that all seeds emerge as plants, it is suggested that six seeds be planted per foot of row so that the total plant population is 105,000 plants per acre. In recent years, it has become more common to plant soybeans with row widths less than thirty inches. Many farmers are now planting with row widths of fifteen inches or less with a corresponding increase in the seed spacing in an individual row.

In practice, not all seeds germinate and not all germinated seeds emerge as plants. As discussed in the Christmas article, emergent rates are adversely affected if the soil is cloddy, compacted, or crusted. FIG. 5 shows a portion of a prior art field having six soybean plants, only three of which have emerged through a top crusted layer of soil. To compensate for lower emergent rates, it is recommended to increase the seed rate (and thereby decrease the seed spacing in a row).

A seed spacing commonly known as "hill drop" planting was practiced in the past. In hill drop planting, a group of seeds are planted together in spaced apart holes and the holes are then filled to form hills. In hill drop planting, there is no spacing between the seeds in each hill. The seeds are in contact with each other and are often on top of each other. It was observed that seeds covered by other seeds often failed to emerge. As a result, hill drop planting was largely discontinued.

Despite the large amount of research on optimal seed spacing performed to date, there continues to be a demand for an apparatus and a method for improved seed spacing during planting that results in greater yield per acre in some soil conditions.

SUMMARY OF THE INVENTION

The general objects of this invention are to provide an apparatus and a method for improved seed spacing during planting that results in greater yield per acre in some soil conditions.

I have invented an improved seed meter. The seed meter comprises a rotating plate having a periphery with a plurality of receptacles for holding seeds, the receptacles arranged in groups of at least two receptacles wherein the receptacles within each group are separated by a first radial angle, wherein the groups are separated by a second radial angle, and wherein the second radial angle is at least two times the first radial angle.

I have also invented an improved rotating plate for a seed meter. The rotating plate has a periphery with a plurality of receptacles for holding seeds, the receptacles arranged in groups of at least two receptacles wherein the receptacles within each group are separated by a first radial angle, wherein the groups are separated by a second radial angle, and wherein the second radial angle is at least two times the first radial angle.

I have also invented an improved method for spacing seed during planting in a field. The method comprises: (a) delivering a group of at least two seeds with a seed spacing into a trench; (b) not delivering any seeds into the trench for a group spacing, wherein the group spacing is at least two times the seed spacing; and (c) repeating steps (a) and (b).

The apparatus and method of this invention provide an improved seed spacing during planting that results in greater yield per acre in some soil conditions.

BRIEF DESCRIPTION OF THE DRAWINGS

FIG. 1 is a prior art seed planter for passing through a field and planting seeds into a trench.

FIG. 2 is the front side of a rotating plate of a prior art seed meter.

FIG. 3 is the back side thereof.

FIG. 10 is the front side of a third embodiment of a rotating plate for a seed planter of this invention.

FIG. 11 is the back side thereof.

FIG. 12 is a detail of FIG. 7 showing the radial angles.

DETAILED DESCRIPTION OF THE INVENTION

1. The Invention in General

A first aspect of this invention is a seed meter with a rotating plate having a periphery with a plurality of receptacles for holding seeds. The receptacles are arranged in groups of at least two receptacles. The receptacles are generally holes or recesses. The receptacles within each group are separated by a first radial angle, the groups are separated by a second radial angle, and the second radial angle is at least two times the first radial angle. The use of this seed meter delivers a first group of seeds with a relatively small seed spacing into a trench and then passes over the trench without delivering any seeds for a group spacing, and then repeats the pattern of grouping and spacing multiple times.

A second aspect of this invention is a method for spacing seed during planting in which a first group of seeds with a seed spacing are delivered into a trench and then the trench is passed over without delivering any seeds into the trench for a group spacing. The spacing between each group is at least two times the spacing between the seeds within a group. This seed spacing is referred to herein as "bundle drop" seed spacing or "bundle drop" seed grouping. It has surprisingly been found that this bundle drop spacing of seeds improves plant emergent rates and yields, especially in cloddy, compacted, and crusted soil.

2. The Seed Meter and Rotating Plate

The seed meter of this invention is typically part of a multiple-unit planter that is pulled through a field by a tractor. Seeds from a hopper pass through the seed meter and are delivered into a trench in the soil. The seed meter regulates the rate and grouping of the seeds. The seed meter generally has a rotating plate with multiple receptacles for holding seed. Unlike a conventional rotating plate in which the receptacles are evenly distributed around the periphery, the rotating plate of the seed meter of this invention has receptacles that are unevenly distributed. Three suitable rotating plates are shown in FIGS. 6 to 12.

Figure 6:
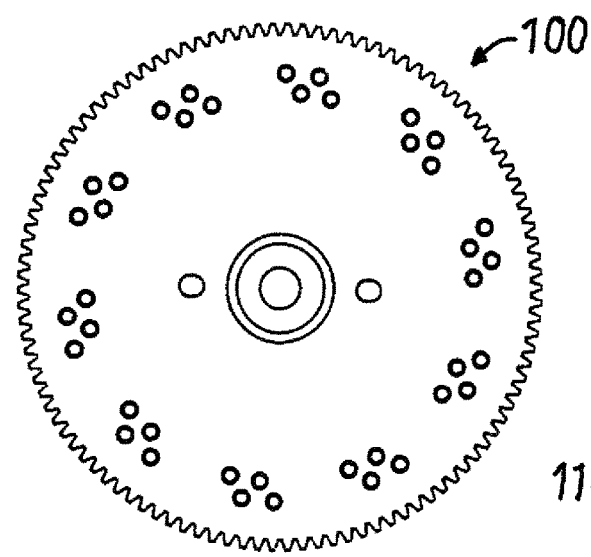
FIG. 6 is the front side of a first embodiment of a rotating plate for a seed planter of this invention.
Figure 7:
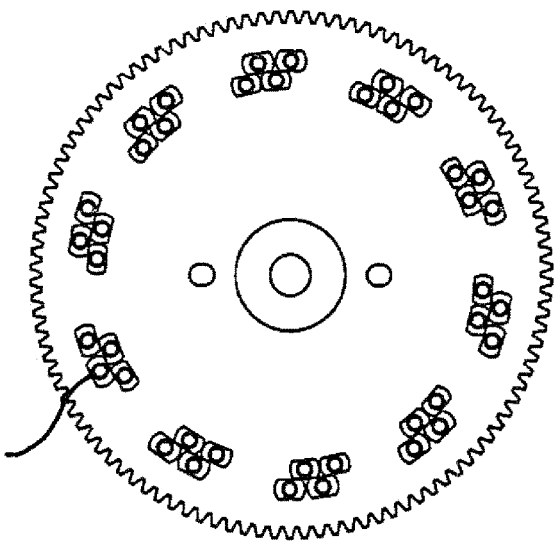
FIG. 7 is the back side thereof.

The first rotating plate shown in FIGS. 6 and 7 is suitable for use in a seed planter of the type manufactured and sold by Precision Planting LLC of Pontiac, Ill. The first rotating plate 100 has ten groups, each of which has four opening-type receptacles 110. As seen in FIG. 12, the radial angle between each receptacle θ in a group is 4.5 degrees. The radial angle between each group φ is 22.5 degrees (five times θ as measured from the center of the receptacles).

Figure 8:
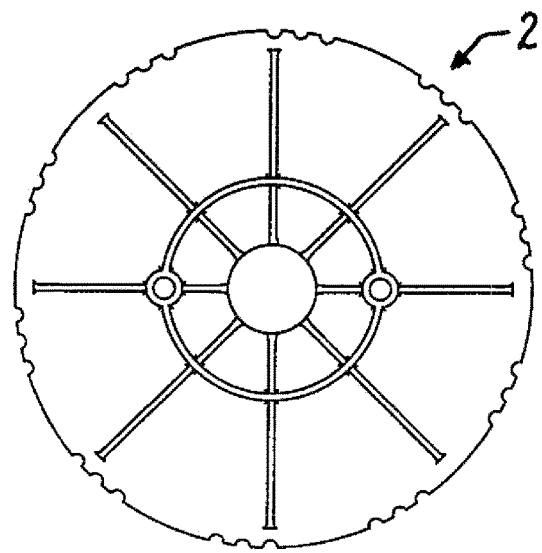
FIG. 8 is the front side of a second embodiment of a rotating plate for a seed planter of this invention.
Figure 9:
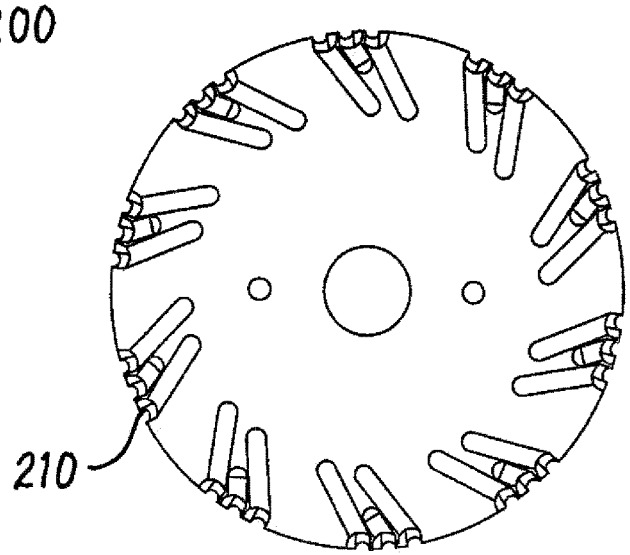
FIG. 9 is the back side thereof.

The second rotating plate shown in FIGS. 8 and 9 is suitable for use in a seed planter manufactured and sold by Kinze Manufacturing, Inc. of Williamsburg, Iowa. The second rotating plate 200 has ten groups, each of which has three recess-type receptacles 210. Each receptacle forms a semi-circular notch on the outside of the plate. The radial angle between each receptacle in a group is 6 degrees. The radial angle between each group is 24 degrees (four times the radial angle between receptacles in a group as measured from the center of the receptacles).

The third rotating plate shown in FIGS. 10 and 11 is suitable for use in a seed meter manufactured and sold by Deere & Company of Moline, Ill. The third rotating plate 300 has eighteen groups, each of which has three recess-type receptacles 310. The radial angle between each receptacle in a group is 3.33 degrees. The radial angle between each group is 13.3 degrees (four times the radial angle between receptacles in a group as measured from the center of the receptacles).

A variety of seed meters for uniform seed spacing are known and all are easily modified with replacement rotating plates to provide the bundle drop group distribution of this invention. Minor modifications to extractors and other parts of the seed planter are sometimes necessary. The three rotating plates shown in FIGS. 6 to 12 differ from the conventional plates of the seed meters for which they are suitable in that they have one-half the number of receptacles. This fraction is preferred for ease of manufacture and ease of substitution. However, it is understood that the fraction can vary as desired.

Each bundle drop group of receptacles has at least two receptacles. Each group preferably comprises two to ten receptacles and most preferably comprises three to six receptacles. Each group generally contains the same number of receptacles, but the number can vary if desired. The radial angle between receptacles in a group is generally about two to ten degrees. The radial angle between each bundle drop group of receptacles is at least two times the radial angle between receptacles within a group. The radial angle between groups is generally two to ten times the radial angle between receptacles within a group, and is preferably three to six times the radial angle between receptacles within a group. The radial angle between receptacles within a group and between bundle groups has a direct effect on the spacing of the planted seeds within a group and between groups. For example, if the radial angle between receptacles in a group is four times the radial angle between bundle groups, the spacing of the groups in the trench will be four times the spacing between seeds within a group.

3. The Method

Figure 13:
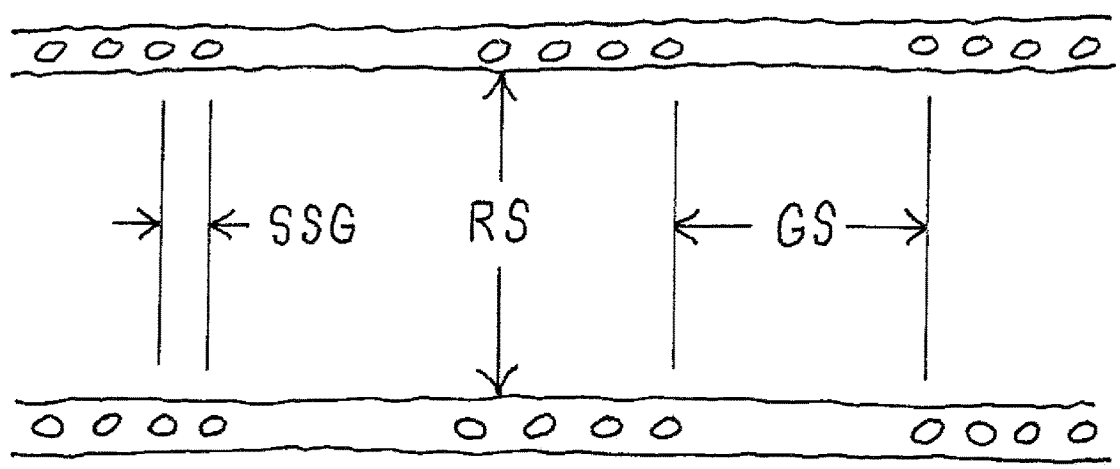
FIG. 13 is a top view of a seed distribution of this invention.

The method of this invention delivers bundle drop groups of seeds into a trench followed by spaces containing no seeds. Each group comprises at least two seeds and preferably comprises two to ten seeds. The spacing between seeds in a group is generally about one-half to four inches and is preferably about one to three inches. The space between each group of seeds is at least two times the space between seeds within a group. The space between groups is generally two to ten times the space between seeds within a group, and is preferably three to six times. The spacing is chosen to achieve the desired number of seeds per unit area. The seed spacing is shown in FIG. 13 where "SSG" is the seed spacing within a group and "GS" is the spacing between groups of seed. The method of this invention generally uses seed meters with rotating plates having the distribution of receptacles as described above. However, the method is also practiced with other types of seed meters.

The optimal number of seeds planted in a field using the method of this invention is believed to be the same or similar to the optimal number using conventional spacing. Therefore, the speed of the rotating plate in each seed meter must be increased according to the number of receptacles. For example, the conventional rotating plate shown in FIGS. 2 and 3 has eighty receptacles. If this plate were replaced by the rotating plate shown in FIGS. 6 and 7 having forty receptacles, the rotational speed of the plate would have to be doubled to plant the same number of seeds in a row (assuming the tractor speed remains constant).

4. Advantages

Figure 4:
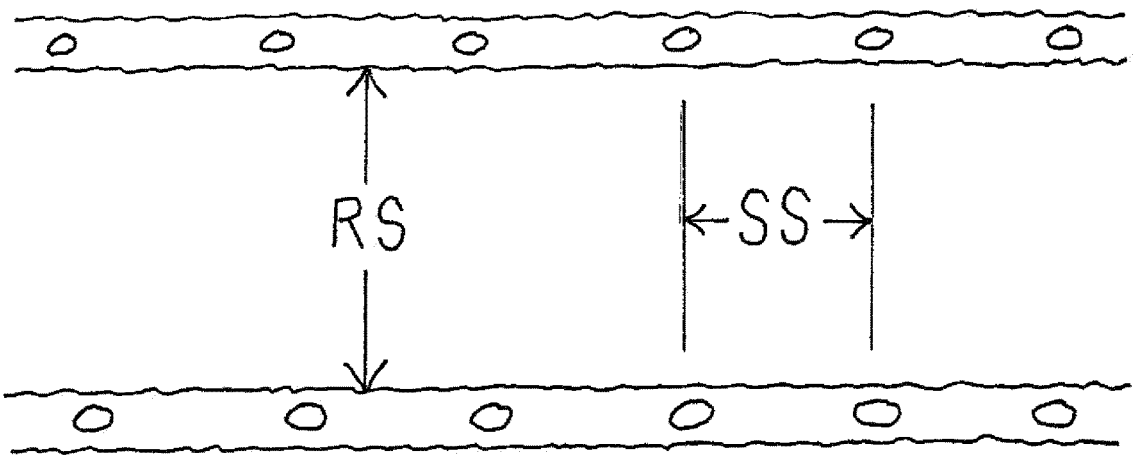
FIG. 4 is a top view of a prior art seed distribution.
Figure 5:
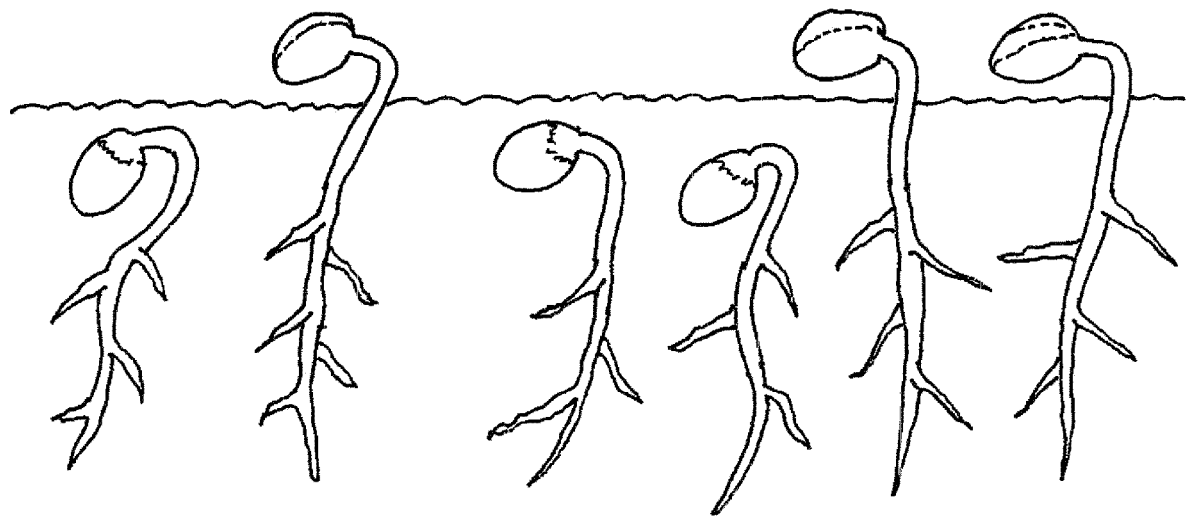
FIG. 5 is an elevation view of a prior art seed emergence.
Figure 14:
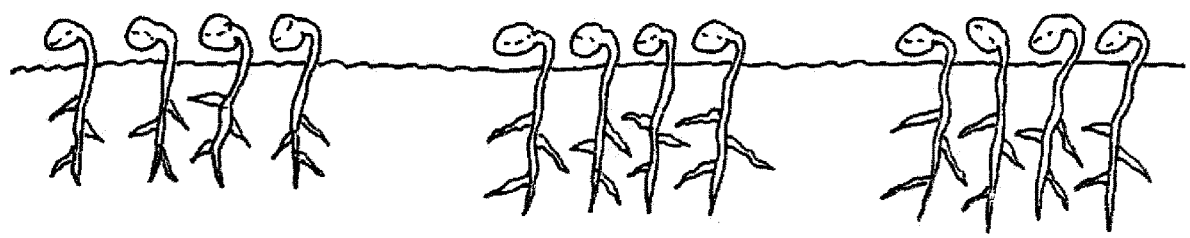
FIG. 14 is an elevation view of a seed emergence of this invention.

While the prior art teaches that uniform distribution of seeds is desired, it has been surprisingly found that unequal distributions of seeds in bundle drop groups actually produces better emergent rates and higher yields, at least in certain types of soil conditions. More particularly, bundle drop grouping of seeds is especially advantageous in cloddy, compacted, and crusted soil. While not wishing to be bound by theory, it is believed that a group of seedlings is better able to break through a crust as shown in FIG. 14 than seedlings that are separated from one another as shown in FIG. 5.

The apparatus and method of this invention have multiple advantages over prior art apparatuses and methods, especially in narrow rows in cloddy, compacted, and crusted soil. They produce faster and greater plant emergence rates that, in turn, produce higher yields. They also allow greater air flow through the plant canopy that is expected to reduce foliar disease and white mold. They are especially beneficial with soybeans, but also are beneficial with other crops.

5. EXAMPLES

The following examples are illustrative only.

Example 1

This example illustrates the improved emergence rate for soybeans planted using the apparatus and method of this invention.

A planter containing twenty-four seed meters manufactured and sold by Precision Planting LLC was modified by replacing the rotating plates in the seven seed meters on the right side with rotating plates having a bundle drop spacing as shown in FIGS. 6 and 7. A field in Sangamon County, Illinois that was historically prone to crusting was then planted in soybeans using twenty inch rows and about four seeds per foot. One pass through the field was made, the tractor then made a 180 degree turn to the right and a second pass was made, resulting in fourteen adjacent rows planted in the experimental bundle drop spacing with an adjacent portion with rows planted conventionally with uniform seed spacing.

A total of two experimental 1.3 acre portions of the field were planted in a bundle drop repeating pattern with four seeds in a group and then a space. The seed spacing in each group was about one and one-half inches and the spacing between groups was about seven and one-half inches so the average total number of seeds per foot was about four, the same as in the control group. A total of two control 2.0 acre portions of the field adjacent the two experimental portions were planted in a conventional manner with about four seeds per foot. Both the experimental and control portions had about 140,000 seeds planted per acre.

After planting, the field experienced steady rains during the growing season that caused a light crust to form. After the soybeans emerged about two weeks after planting, the number of emerging plants in twelve foot long row sections in the experimental and control portions were counted. The results are shown in the following Table 1.

TABLE 1

| Comparison of Number of Emergent Plants | |
|---|---|
| Portion of Field | Number of Plants |
| Experimental Portion #1 | 29 |
| Control Portion #1 | 14 |
| Experimental Portion #2 | 32 |
| Control Portion #2 | 18 |

The above results show that the number of emerging plants in the bundle drop experimental rows was almost double [(29+32)/(14+18)] the number of emerging plants in the control rows.

Example 2

This example illustrates the improved yields for soybeans planted using the apparatus and method of this invention. The field described in Example 1 was harvested. The two experimental bundle drop 1.3 acre portions and the two control 2.0 acre control were kept separate. The results of the harvest are shown in the following Table 2.

TABLE 2

Comparison of Yields

| Portion of Field | Yield (Bushels/Acre) |
|---|---|
| Experimental Portion #1 | 99.1 |
| Control Portion #1 | 97.6 |
| Experimental Portion #2 | 98.4 |
| Control Portion #2 | 96.8 |

The above results show that the experimental bundle drop seed spacing improved yields by 1.5 bushels/acre (99.1–97.6) in the first comparison and by 1.6 bushels/acre (98.4–96.8) in the second comparison. The early part of the growing season was characterized by relatively steady rains that caused a relatively light crust to form. The improvement in yields would be expected to be even more significant in a growing season having heavier rains that would cause a thicker crust to form.

I claim:

1. A seed meter comprising a rotating plate having a periphery with a plurality of receptacles for holding seeds, the plurality of receptacles arranged in groups of at least two receptacles wherein each of the plurality of receptacles within each group is separated from each adjacent receptacle by a first radial angle, wherein the groups are separated by a second radial angle, and wherein the second radial angle is at least two times the first radial angle.

2. The seed meter of claim 1 wherein the second radial angle is two to ten times the first radial angle.

3. The seed meter of claim 2 wherein the second radial angle is three to six times the first radial angle.

4. The seed meter of claim 1 wherein each receptacle comprises an opening.

5. The seed meter of claim 1 wherein each group contains two to ten receptacles.

6. The seed meter of claim 5 wherein each group contains three to six receptacles.

7. A rotating plate for a seed meter, the rotating plate having a periphery with a plurality of receptacles for holding seeds, the plurality of receptacles arranged in groups of at least two receptacles wherein each of the plurality of receptacles within each group is separated from each adjacent receptacle by a first radial angle, wherein the groups are separated by a second radial angle, and wherein the second radial angle is at least two times the first radial angle.

8. The rotating plate of claim 7 wherein the second radial angle is two to ten times the first radial angle.

9. The rotating plate of claim 8 wherein the second radial angle is three to six times the first radial angle.

10. The rotating plate of claim 7 wherein each receptacle comprises an opening.

11. The rotating plate of claim 7 wherein each group contains two to ten receptacles.

12. The rotating plate of claim 11 wherein each group contains three to six receptacles.

\* \* \* \* \*